Nov. 8, 1932.  T. J. NEWMAN  1,887,421
TESTING DEVICE
Filed Dec. 11, 1930    2 Sheets-Sheet 1

Inventor
THOMAS J. NEWMAN
By Edward E. Clement
Attorney

Nov. 8, 1932.  T. J. NEWMAN  1,887,421

TESTING DEVICE

Filed Dec. 11, 1930  2 Sheets-Sheet 2

INVENTOR.
THOMAS J. NEWMAN
BY
Edward E. Clement
ATTORNEY.

Patented Nov. 8, 1932

1,887,421

UNITED STATES PATENT OFFICE

THOMAS J. NEWMAN, OF CANTON, OHIO

TESTING DEVICE

Application filed December 11, 1930. Serial No. 501,721.

My invention relates to electrical accessories and equipment, and has for its object the production of means to facilitate better and easier testing of electrical circuits and apparatus at low production cost. An ancillary object is the production of a testing jack which shall be absolutely reliable and by means of which tests can be made without removing the testing plug therefrom at any time.

I attain my principal object by providing a testing jack with flexible springs connected in series between terminals included in the circuit to be tested. Extending from each of said terminals toward the other one, and overlapping each other at one side of the jack are a pair of short circuiting conductors through which a metal test screw passes. By screwing this down, the two strips are connected and the jack short circuited. By backing it off a few turns, the two strips are disconnected and the jack is then immediately included in circuit between the terminals.

One of the short circuiting strips may conveniently be integral with one of the jack springs, and a convenient method of disconnecting the test screw therefrom, is by making the hole through said strip of somewhat greater diameter than the shank of the screw, whereby the rotation of the screw through a relatively small angle, proportionate to the pitch of the thread, will cause its head to break contact with the strip.

A further ancillary object is to improve the structure and operation of test plugs used with jacks of the type herein described. I attain this object by providing a pair of copper strips insulated from each other and formed so as to be self-guiding and self-aligning in the jack springs. These strips have terminals for the testing leads, and the whole assembly is held together by two semicylindrical insulating blocks of different colors and enclosed within a cylindrical casing secured to said blocks and forming a convenient handle for the plug.

My invention is illustrated in the accompanying drawings, in which

Figure 1:
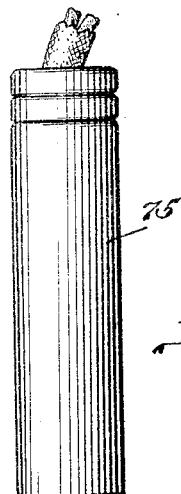
Fig. 1 is a side view showing an insulating base with the parts of my test jack assembled thereon, and the test plug inserted in the jack.
Figure 3:
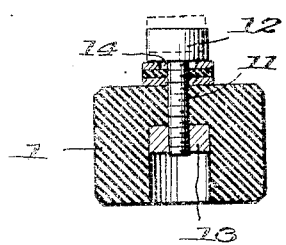
Fig. 3 is a transverse section on the line 3—3 of Fig. 1.
Figure 2:
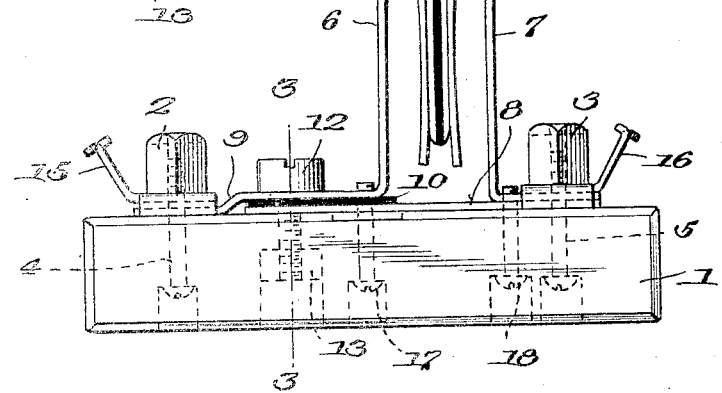
Fig. 2 is a plan view of the jack and base with the plug removed.
Figure 2:
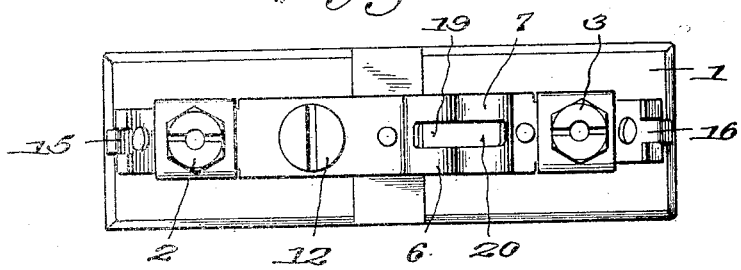

Referring first to Figs. 1, 2, 3, 1 indicates a base of suitable insulating material, carrying terminals 2 and 3 secured in the usual or any other suitable manner, as by means of screws 4 and 5. Extending toward each other from these two terminals are the jack springs 6 and 7 which when the plug is removed therefrom, as shown in Fig. 2, come into contact with each other. In more primitive forms of apparatus, this contact would be relied upon to maintain the normal continuity of the circuit but in practice it is found that the springs sometimes fail to make perfect contact. In order to meet this condition when it arises, and normally close the circuit between the terminals 2 and 3, it has been proposed to use a knife blade switch which in some cases operates on parallel lines to the jack spring (see Letters Patent No. 1,764,016), and in other cases operates through the slots in the springs themselves, (see Letters Patent No. 1,725,049). The use of a switch in this manner not only adds substantially to the expense of the testing device as a whole, but it is also clumsy and in some cases cannot be operated without removing the plug from the jack.

According to my invention, I provide a strip of metal 8 extending along the top of the base from the terminal 3 nearly to the terminal 2, so that strip 9, connected to the terminal 2, will overlap the same. To prevent contact between them, I interpose a strip 10 of any suitable insulating material. The two strips 8 and 9 are connected through the insulating strip 10 by the screw 12 whose shank is passed through the strip 8 into a metal anchor block 13 countersunk in the bottom of the base 1. The threads of the shank 11 may go all the way up to the head 12 of the screw which normally rests upon the strip 9 and thereby completes an electrical connection between that strip and the strip 8. When the screw is backed off however, no contact is made with strip 9, because the opening 14 in said strip is of larger diameter than the shank 11 of the screw.

It will be observed that in the specific form chosen for illustration herein, the strip 9 forms an integral extension of the jack spring 6, and extends through one of the terminals 2 into connection with the wire terminal 15. The spring 7 has its base member extend beneath the terminal 3 into connection with the wire terminal 16. In the form shown these connections are maintained by the screws 5 with their heads countersunk in the under side of the block. Anchor screws for the base plates of the two jack springs are also provided as shown at 17 and 18.

The operation of the device thus described is as follows: When not testing, the jack springs 6 and 7 are closed, the screw 12 is turned down tightly against the strip 9, and there is perfect continuity of circuit between the terminals 2 and 3. Under ordinary circumstances the jack itself is capable of carrying a full load of a five ampere meter but for reasons already stated, I have found it desirable in order to prevent any accidental opening, to shunt out the jack, which is accomplished by means of the test screw 12. This screw when tightened by-passes the jack through the copper strip 8 and test screw 12. In testing, the plug is inserted in the jack as shown in Fig. 1, the screw 12 is loosened and backed out for a few turns, and the circuit is then entirely through the jack and plug so that the instrument to which the plug is attached is placed in series in the circuit to which the terminals 2 and 3 are connected.

By again turning down the screw 12, the testing jack is shunted out and if desired the plug may be left in place. This combination of jack and test screw is very flexible, and together with a knife blade switch mounted on a common base may be assembled in a plurality of arrangements.

Figure 4:
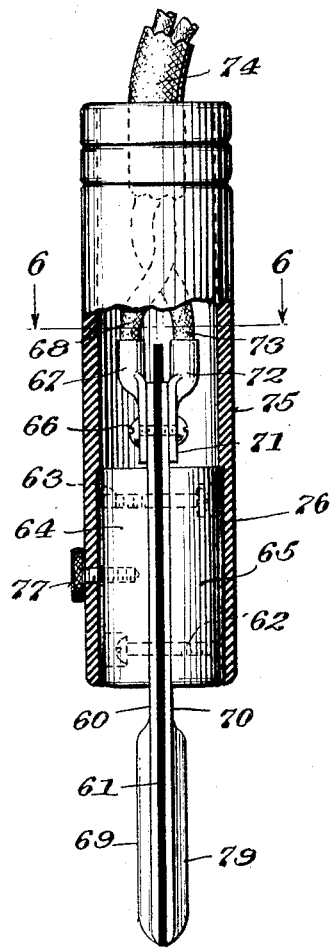
Fig. 4 is a side view partly in section of my improved plug.
Figure 5:
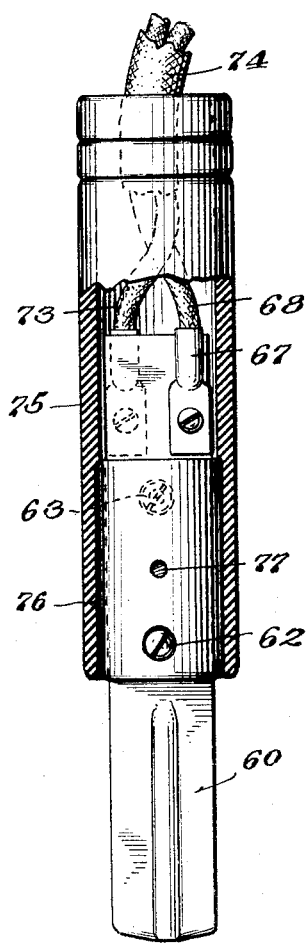
Fig. 5 is a similar view of the plug, taken at right angles to the view of Fig. 4.
Figure 6:
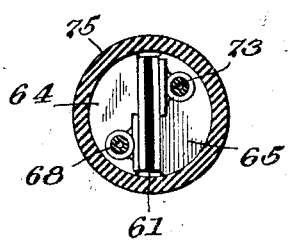
Fig. 6 is a transverse section taken on the line 6—6 of Fig. 4.

Referring now to Figs. 4, 5 and 6, I have therein shown the structure of my testing plug which is an improvement in various respects over plugs of the prior art. The plug consists essentially of two copper strips 60 and 70 separated from each other by an insulating strip 61, the three strips being clamped together by screws 62 and 63 passing through blocks of hard fiber or other suitable material 64 and 65. One of these blocks is of black fiber and the other of red fiber, and the two when put together form a cylindrical figure. The strip 60 carries a terminal 66 having a socket 67 to receive the test wire 68; and the strip 70 carries a similar terminal 71 with a socket 72 to receive the companion test wire 73. These test wires 68 and 73 are the usual pair forming part of the flexible cord 74.

The two blades 60 and 70 with their associated parts thus described, being assembled as shown, are enclosed within a cylindrical shell or tube 75 which is counterbored to furnish a back stop at 76, thus taking care of any thrust that may occur when inserting the plug in position. This shell is locked in place by the small thumb screw 77 which passes through the shell 75 into one of the fiber blocks 64. It will be understood that the colors of the two parts 64 and 65 indicate the polarization of the plug terminals, and the position of the screw 77 also acts as an indicator of the polarization of the plug. For this reason it should always screw down in the same block, preferably the red block which indicates the positive terminal.

The collar or tube 75 acts when in place as a handle and may be made of any convenient length. Being in the form of a tube, ample space is provided for the testing leads 68 and 73 to enter.

In order to align the plug in the jack automatically, each of the strips 60 or 70 is formed with the longitudinal central rib 69 or 79; and the jack as best shown in Fig. 2 is provided with slots in the springs at 19 and 20 into which said ribs pass when the plug is pushed into the jack. These slots it will be noticed do not extend through the outside leaves of the springs 6 and 7, but stop at the crown thereof and extend only to near the tips of the inner leaves. The full strength of the metal is thus preserved where most needed.

Figure 7:
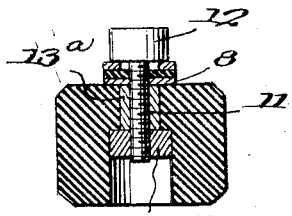
Fig. 7 is a transverse section similar to Fig. 3, showing a modified arrangement of the anchor block with a sleeve bearing on the short circuiting strip.

The operation of the plug as described is almost obvious from the drawings. Its merits are simplicity, compactness, ease of assembly, and low cost of manufacturing, without sacrifice of any essential feature that such a plug should possess. It will be obvious to those skilled in the art that in practising my invention I am not necessarily limited to the precise details of construction which are herein shown and described. A number of changes and modifications may be made in the design and arrangement of parts without departing from the scope and purview of my invention. For example, instead of the shank of the screw 12 being threaded into the strip 8, it may be threaded only into the block 13, and pass through a sleeve 13a which maintains metallic connection between the anchor block 13 and the strip 8, all as shown in Fig. 7. When the screw 12 is set up, all the parts will be clamped tightly together, and when it is backed off, the contact between the head of the screw and the strip 9 will be broken, thereby breaking the shunt circuit around the test jack as before. I contemplate all such non-essential changes and modifications as fall fairly within the scope of the appended claims.

What I claim is:

1. Testing apparatus comprising an insulating support, test terminals mounted on said support, means cooperating with said test terminals to connect a test circuit thereto, a pair of overlapping conducting strips connected to but extending away from the test terminals, and means separate and away from the test terminal adapted to secure said strips together, to by-pass or shunt out the test terminals without interfering with the the connection thereto of the test circuit.

2. A testing device comprising an insulating base, line terminals mounted thereon, a pair of jack springs mounted thereon between said line terminals, short circuiting strips connected to and extending away from said jack springs and connected to said terminals respectively and clamping means separate and apart from said jack springs adapted to electrically and mechanically connect the said short circuiting strips without obstructing the simultaneous use of the test terminal.

3. A testing device comprising an insulating base, line terminals on said base, test terminals on said base, short circuiting conductors extending from said test terminals to a common point on the base separate and apart from said test terminals, and means for connecting them together at said common point without obstructing the simultaneous use of the test terminal.

4. A testing device comprising an insulating base, line terminals on said base, testing terminals on said base, short circuiting conductors extending away from said line terminals and said testing terminals into line with each other, and screw threaded means separate and apart from said testing terminals for connecting the same without interfering with the operation of said testing terminals.

5. A testing device comprising an insulating base, line terminals thereon, jack springs connected in series therewith, short circuiting terminals extending across the base from one line terminal to the other, and means away from and out of line with said jack springs for securing said short-circuiting terminals together without interfering with the operation of said testing terminals.

6. A testing device comprising an insulating base, line terminals on said base, testing terminals on said base, cooperating terminals for said testing terminals, and means adapted to short circuit said testing terminals while the cooperating terminals are connected therewith.

7. A testing device comprising an insulating base, line terminals thereon, jack springs thereon, a test plug adapted to be inserted in jack spring, short circuiting terminals extending from said line terminals around said jack springs, together with means separate and apart from said jack springs for connecting said short circuiting terminals together.

8. A testing device comprising an insulating base, line terminals on the base, jack springs on the base, each jack spring comprising double leaves with both inner leaves slotted and normally in contact with each other, and a plug adapted for cooperation with said jack spring, comprising a pair of conducting strips each formed up with a longitudinal rib adapted to enter one of the slots in said jack springs, an insulating strip interposed between said conducting strips, insulated blocks and clamping screws securing said strips together, and terminals for test wires on the respective conducting strips, together with a pair of connecting strips on the base constituting extensions of said jack springs each of said strips also connected to one line terminal, and means apart from said jack springs and out of the path of travel of said plug adapted to connect said connecting strips and thereby short circuit the jack.

In testimony whereof I hereunto affix my signature.

THOMAS J. NEWMAN.